(12) United States Patent
Ogawa et al.

(10) Patent No.: US 12,480,226 B2
(45) Date of Patent: Nov. 25, 2025

(54) ALN SINGLE CRYSTAL SUBSTRATE

(71) Applicant: NGK INSULATORS, LTD., Nagoya (JP)

(72) Inventors: Hirohisa Ogawa, Kitanagoya (JP); Morimichi Watanabe, Nagoya (JP); Hiroharu Kobayashi, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/786,978

(22) Filed: Jul. 29, 2024

(65) Prior Publication Data

US 2024/0384435 A1 Nov. 21, 2024

Related U.S. Application Data

(63) Continuation of application No. PCT/JP2022/014923, filed on Mar. 28, 2022.

(51) Int. Cl.
*B32B 3/00* (2006.01)
*C30B 29/40* (2006.01)

(52) U.S. Cl.
CPC .............. *C30B 29/403* (2013.01); *B32B 3/00* (2013.01)

(58) Field of Classification Search
CPC .................... C30B 29/403; B32B 3/00
See application file for complete search history.

(56) References Cited

U.S. PATENT DOCUMENTS

| | | |
|---|---|---|
| 7,057,204 B2 | 6/2006 | Shibata |
| 2006/0033119 A1 | 2/2006 | Shibata |
| 2014/0209923 A1 | 7/2014 | Xie et al. |
| 2015/0368832 A1 | 12/2015 | Aida et al. |

FOREIGN PATENT DOCUMENTS

| | | |
|---|---|---|
| JP | 4380294 B2 | 5/2005 |
| JP | 200652102 A | 2/2006 |
| JP | 2016511938 A | 4/2016 |
| JP | 201973402 A | 5/2019 |

(Continued)

OTHER PUBLICATIONS

International Search Report, with English translation, issued in corresponding International Application No. PCT/JP2022/014923, date of mailing Jun. 7, 2022 (5 pages).

(Continued)

*Primary Examiner* — Elizabeth E Mulvaney
(74) *Attorney, Agent, or Firm* — FLYNN THIEL, P.C.

(57) ABSTRACT

There is provided an AlN single-crystal substrate of a circular shape with a radius r, wherein when the AlN single-crystal substrate is sectioned into three regions, the three regions being a central section, which is a region radially extending from a center of the AlN single-crystal substrate to 0.4r, a middle section, which is a region excluding the central section from a region radially extending from the center of the AlN single-crystal substrate to 0.7r, and an outer circumferential section, which is a region excluding the central section and the middle section from an entire region of the AlN single-crystal substrate, a dislocation density Dc of the central section, a dislocation density Dm of the middle section, and a dislocation density Dp of the outer circumferential section satisfy the relationship $Dm > Dp > Dc$.

5 Claims, 3 Drawing Sheets

(56) References Cited

FOREIGN PATENT DOCUMENTS

WO   2014123171 A1   8/2014

OTHER PUBLICATIONS

Written Opinion of International Searching Authority, with English translation, issued in corresponding International Application No. PCT/JP2022/014923, date of mailing Jun. 7, 2022 (8 pages).
Dr. T. Kato et al., Hetero-epitaxial Growth Mechanisms of AlN Single Crystals in Sublimation Growth; Fujikura Technical Journal, vol. 2, No. 125, pp. 47-53, 2013 (14 pages).

AlN SINGLE CRYSTAL SUBSTRATE

CROSS-REFERENCE TO RELATED APPLICATION

This application is a continuation application of PCT/JP2022/014923 filed Mar. 28, 2022, the entire contents of which are incorporated herein by reference.

BACKGROUND OF THE INVENTION

1. Field of the Invention

The present invention relates to an AlN single-crystal substrate.

2. Description of the Related Art

Aluminum nitride (AlN) single crystals have recently attracted attention as base substrates for deep ultraviolet light emitting elements using AlN-based semiconductors. For example, AlN, AlGaN, and the like are used as AlN-based semiconductors. These AlN-based semiconductors have a direct band gap structure, which makes them suitable for light-emitting devices and applicable to light emitting diodes (LEDs) and laser diodes (LDs) in the deep ultraviolet region.

To achieve high efficiency in such light emitting devices, AlN single-crystal substrates used as base substrates have been required to have a reduced dislocation density. For this reason, AlN substrates with a reduced dislocation density to be used as base substrates are under development. For example, Non-Patent Literature 1 (Tomohisa Kato et al., "Hetero-epitaxial Growth Mechanisms of AlN Single Crystals in Sublimation Growth", Fujikura Technical Journal, 2013, Vol. 2, No. 125, pp. 47-53) discloses a method for growing an AlN single crystal on a seed substrate using a sublimation method.

CITATION LIST

Patent Literature

Patent Literature 1: JP4380294B

Non-Patent Literature

Non-Patent Literature 1: Tomohisa Kato et al., "Hetero-epitaxial Growth Mechanisms of AlN Single Crystals in Sublimation Growth", Fujikura Technical Journal, 2013, Vol. 2, No. 125, pp. 47-53

SUMMARY OF THE INVENTION

However, the technique as disclosed in Non-Patent Literature 1 is likely to cause an off-angle distribution on the substrate after being polished, resulting in a lower yield of devices. That is, variations in the off-angle of the base substrate result in a lower yield of devices fabricated using the base substrate. Therefore, it is desired to reduce the off-angle distribution in the base substrate.

As a method for producing a GaN single-crystal substrate, though not an AlN single-crystal substrate, with a small off-angle distribution, Patent Literature 1 (JP4380294B) discloses a method in which a GaN layer is grown on a sapphire substrate by MOVPE, a TiN film is further formed on the GaN layer, and then GaN is deposited on the TiN film.

However, an AlN single-crystal substrate fabricated following the method disclosed in Patent Literature 1 has a high dislocation density and thus, is unsuitable as a base substrate for producing high-quality light emitting devices.

The present inventors have now found that by allowing the dislocation densities of three regions of an AlN single-crystal substrate, composed of a central section, a middle section, and an outer circumferential section, to satisfy a predetermined relationship, it is possible to reduce the off-angle distribution that occurs in the AlN single-crystal substrate.

Therefore, it is an object of the present invention to provide an AlN single-crystal substrate having a reduced off-angle distribution.

According to an aspect of the present invention, there is provided an AlN single-crystal substrate of a circular shape with a radius r,
  wherein when the AlN single-crystal substrate is sectioned into three regions, the three regions being:
  a central section, which is a region radially extending from a center of the AlN single-crystal substrate to 0.4r,
  a middle section, which is a region excluding the central section from a region radially extending from the center of the AlN single-crystal substrate to 0.7r, and
  an outer circumferential section, which is a region excluding the central section and the middle section from an entire region of the AlN single-crystal substrate,
  a dislocation density $D_c$ of the central section, a dislocation density $D_m$ of the middle section, and a dislocation density $D_p$ of the outer circumferential section satisfy the relationship $D_m > D_p > D_c$.

DETAILED DESCRIPTION OF THE INVENTION

AlN Single-Crystal Substrate

Figure 1:
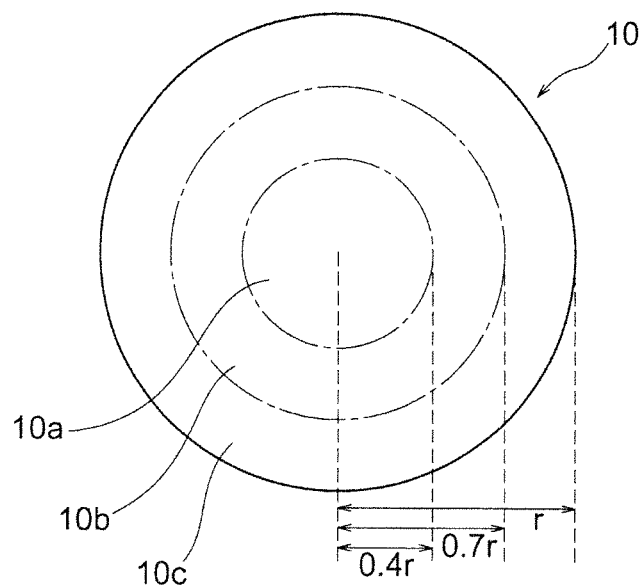
FIG. 1 is a top view of the AlN single-crystal substrate 10 for illustrating the central section, middle section, and outer circumferential section of the AlN single-crystal substrate 10.

An AlN single-crystal substrate according to the present invention has a circular shape with a radius r. As shown in FIG. 1, this AlN single-crystal substrate can be sectioned into three regions, i.e., a central section 10a, a middle section 10b, and an outer circumferential section 10c. The central section 10a is a region radially extending from a center of the AlN single-crystal substrate 10 to 0.4r. The middle section 10b is a region excluding the central section 10a from a region radially extending from the center of the AlN single-crystal substrate 10 to 0.7r. The outer circumferential section 10c is a region excluding the central section 10a and the middle section 10b from an entire region of the AlN single-crystal substrate 10. When a dislocation density of the central section is defined as Dc, a dislocation density of the middle section is defined as Dm, and a dislocation density of the outer circumferential section is defined as Dp, the relationship Dm>Dp>Dc is satisfied. In this manner, by allowing the dislocation densities of the three regions of the AlN single-crystal substrate 10, composed of the central section 10a, middle section 10b, and outer circumferential section 10c, to satisfy the predetermined relationship, it is possible to reduce the off-angle distribution that occurs in the AlN single-crystal substrate 10. Moreover, devices obtained using such an AlN single-crystal substrate 10 can have an improved yield. That is, as described above, variations in the off-angle of an AlN single-crystal substrate used as a base substrate result in the drawback of a lower yield of devices fabricated using the base substrate. In this respect, the AlN single-crystal substrate of the present invention can advantageously overcome the aforementioned drawback.

In the AlN single-crystal substrate, the dislocation density Dc of the central section is preferably 0 to 1000/cm$^2$, more preferably 100 to 700/cm$^2$, and still more preferably 300 to 700/cm$^2$. The dislocation density Dm of the middle section is preferably 2000 to 4000/cm$^2$, more preferably 2000 to 2500/cm$^2$, and still more preferably 2300 to 2500/cm$^2$. The dislocation density Dp of the outer circumferential section is preferably 1000 to 2000/cm$^2$, more preferably 1200 to 1800/cm$^2$, and still more preferably 1600 to 1800/cm$^2$.

In the AlN single-crystal substrate, it is preferred that dislocations present in the middle section include more basal plane dislocations than threading dislocations, and that dislocations present in the outer circumferential section include more threading dislocations than basal plane dislocations. As used herein, the threading dislocations include threading edge dislocations (TEDs), threading screw dislocations (TSDs), or mixed dislocations. The term "threading" means that the dislocation line is substantially parallel to the [0001] axis of the hexagonal crystal system. The term "basal" means that the dislocation line is within the (0001) plane of the basal hexagonal crystal system. For example, the ratio of threading dislocation density to basal plane dislocation density in the dislocations present in the middle section is preferably 0.8 or less, while the ratio of threading dislocation density to basal plane dislocation density in the dislocations present in the outer circumferential section is preferably 1.2 or more. In this manner, the off-angle distribution can be further reduced. Methods of measuring such a dislocation density distribution include, but are not specifically limited to, X-ray topography measurement, TEM observation, and etch pit evaluation.

Figure 2:
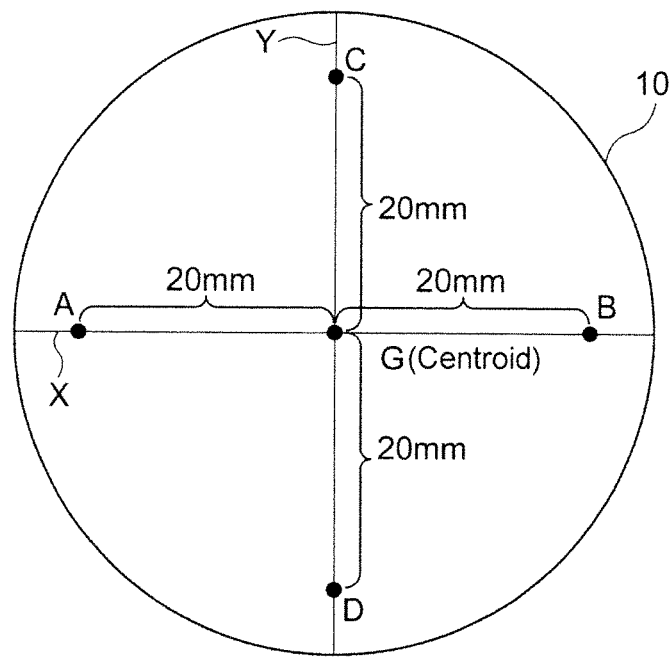
FIG. 2 is a top view of the AlN single-crystal substrate 10 for illustrating a method of measuring an amount of warpage of the AlN single-crystal substrate 10.
Figure 3:
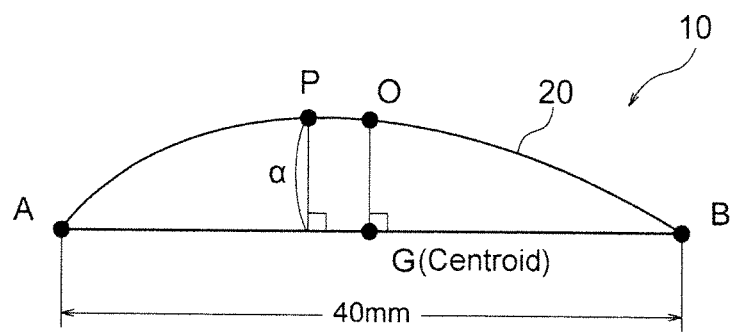
FIG. 3 is a schematic cross-sectional view of the AlN single-crystal substrate 10 for illustrating a method of measuring an amount of warpage of the AlN single-crystal substrate 10.
Figure 4:
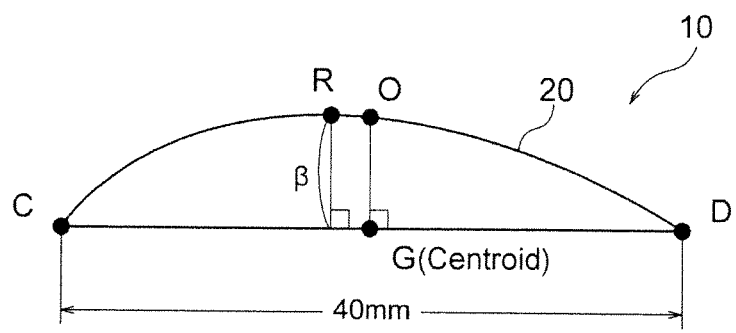
FIG. 4 is a schematic cross-sectional view of the AlN single-crystal substrate 10 for illustrating a method of measuring an amount of warpage of the AlN single-crystal substrate 10.

The AlN single-crystal substrate 10 preferably has an amount of warpage of 0.5 to 25 μm, more preferably 0.5 to 15 μm, and still more preferably 1 to 15 μm. As used herein, the amount of warpage is defined as follows: as shown in FIGS. 2 to 4, when, in a plan-view illustration of a surface of the AlN single-crystal substrate 10 when viewed in plan, two straight lines X and Y are drawn, the straight lines X and Y passing a point G, which is a centroid in the plan-view illustration, and being orthogonal to each other, and then a point A and a point B are defined as two points each positioned on the straight line X and 20 mm away from the point G, and a point C and a point D are defined as two points each positioned on the straight line Y and 20 mm away from the point G, (i) of line segments extended vertically to a line segment AB from any points on a curved line AB between the points A and B on the surface 20 of the AlN single-crystal substrate 10, a point P is defined as a point on the curved line AB, at which such a line segment has the longest distance; (ii) a distance between the line segment AB and the point P is determined as an amount of warpage α; (iii) of line segments extended vertically to a line segment CD from any points on a curved line CD between the points C and D on the surface 20 of the AlN single-crystal substrate 10, a point R is defined as a point on the curved line CD, at which such a line segment has the longest distance; (iv) a distance between the line segment CD and the point R is determined as an amount of warpage β; and (v) the amount of warpage is defined as an arithmetic mean value of the amounts of warpage α and β.

Figure 5:
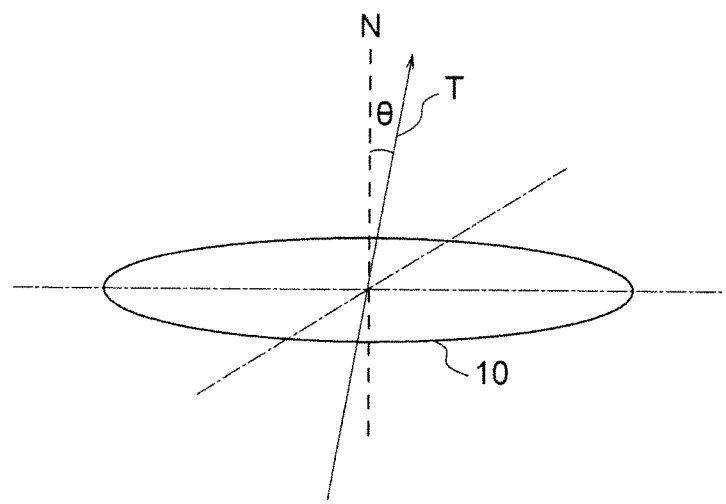
FIG. 5 is a diagram for illustrating an off-angle on the substrate surface, in measurement of the off-angle distribution of the AlN single-crystal substrate 10.
Figure 6:
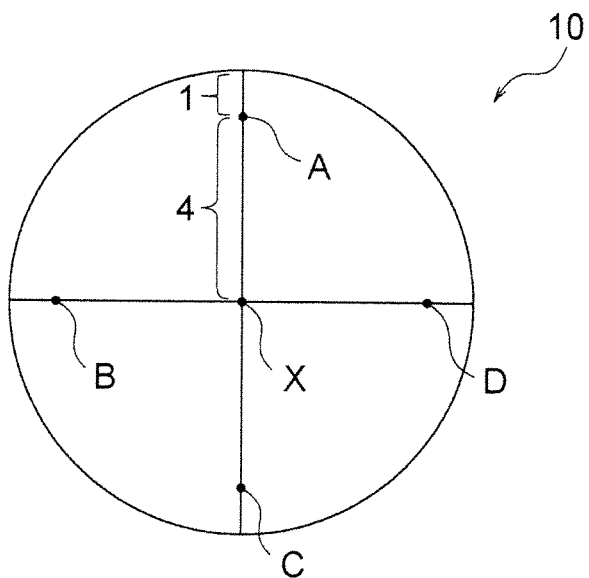
FIG. 6 is a diagram for illustrating the positions of the central point X, and the four outer circumferential points A, B, C, and D, on the substrate surface, in measurement of the off-angle distribution of the AlN single-crystal substrate 10.

As described above, the AlN single-crystal substrate of the present invention achieves a reduced off-angle distribution. As shown in FIG. 5, the off-angle as used herein is typically defined as an inclination angle θ of a crystal axis T oriented in a substantially normal direction of the AlN single-crystal substrate 10, with respect to the normal N to a plate surface of the AlN single-crystal substrate 10. Then, as shown in FIG. 6, the off-angle distribution is typically a difference between a maximum value $θ_{max}$ and a minimum value $θ_{min}$ of off-angles at a central point X, and four outer circumferential points A, B, C, and D, on the surface of the AlN single-crystal substrate 10. The outer circumferential points A, B, C, and D are typically defined so that i) a straight line connecting the outer circumferential points A and C and a straight line connecting the outer circumferential points B and D intersect at right angles at the central point X, and ii) a shortest distance of each of the outer circumferential points A, B, C, and D from an outer edge of the AlN single-crystal substrate is ⅕ of the radius of a semiconductor film. In this manner, in the present invention, the off-angles at a total of the five points, i.e., the central point X, and the four outer circumferential points A, B, C, and D, on the AlN single-crystal substrate surface, are typically used as representative values. This is because evaluating the off-angle distribution across the entire AlN single-crystal substrate surface is time-consuming and unrealistic. Thus, the off-angle distribution obtained based on the off-angles at the central point X, and the outer circumferential points A, B, C, and D, can be evaluated as an off-angle distribution of the entire AlN single-crystal substrate, including the central section, middle section, and outer circumferential section.

Here, the AlN single-crystal substrate of the present invention has a circular shape with a radius r. As used herein, "circular shape" need not be a complete circular shape, and may be a substantially circular shape that can be generally recognized as a circular shape as a whole. For example, the shape may be a shape in which a portion of the circle has been cut out for the purpose of specifying the crystal orientation or other purposes (for example, a circular shape containing an orientation flat or a notch). In this case, in FIG. 6, for example, an outer edge shape of the AlN single-crystal substrate 10, which is to be considered in defining the central point X, and the four outer circumferential points A, B, C, and D, may be determined based on an expected circular shape when the shape is assumed to have no cut-out portion.

The AlN single-crystal substrate of the present invention can have a reduced off-angle distribution, and the central point X, and the outer circumferential points A, B, C, and D, shown in FIG. 6, are merely defined for convenience sake to enable an evaluation of the values of representative off-angles on the entire AlN single-crystal substrate. Therefore, the shape of the AlN single-crystal substrate has been specified as circular, in order to unequivocally determine the positions of the central point X, and the outer circumferential points A, B, C and D; however, even if the shape of the AlN single-crystal substrate is not circular, it makes no difference in terms of inherent meaning. For example, even if the shape of the AlN single-crystal substrate is a square or a rectangle (oblong), any AlN single-crystal substrate in which the dislocation densities in the three regions composed of the central section, middle section, and outer circumferential section of the AlN single-crystal substrate have been controlled can be considered as an equivalent of the AlN single-crystal substrate of the present invention. In an AlN single-crystal substrate of such a shape, when a square or rectangular AlN single-crystal substrate is viewed from the top, the largest circle inscribed in the outer circumferential edge of the substrate is defined as a virtual circle, and the positions of the outer circumferential points A, B, C and D may be determined from the central point X of the virtual circle and the diameter of the virtual circle (in the same manner as with the above-described circular AlN single-crystal substrate). By evaluating the off-angle distribution based on the off-angles at the central point X, and the outer circumferential points A, B, C, and D thus determined, the same evaluation as that of the circular AlN single-crystal substrate can be performed. Moreover, the arithmetic mean angle of the off-angles at the central point X, and the outer circumferential points A, B, C, and D, on the surface of the AlN single-crystal substrate, is preferably 0.01 to 1.0°, more preferably 0.05 to 0.5°, and still more preferably 0.2 to 0.4°.

The AlN single-crystal substrate according to the present invention is preferably an oriented layer that is oriented in both the c- and a-axis directions, and may contain a mosaic crystal. The mosaic crystal refers to a crystal that does not have distinct grain boundaries but is an aggregation of crystals whose crystal orientation slightly deviates from one or both of the c- and a-axes. Such an oriented layer has a structure in which the crystal orientation is substantially aligned with a substantially normal direction (c-axis direction) and an in-plane direction (a-axis direction). Such a structure allows a semiconductor layer with an excellent quality, particularly an excellent orientation, to be formed on the oriented layer. That is, when forming a semiconductor layer on the oriented layer, the crystal orientation of the semiconductor layer substantially matches the crystal orientation of the oriented layer. Therefore, a semiconductor film formed on the AlN single-crystal substrate tends to be an oriented film.

Methods of evaluating the orientation in the AlN single-crystal substrate of the present invention include, but are not specifically limited to, known analytical techniques such as the EBSD (Electron Back Scatter Diffraction Patterns) method and X-ray pole figures. For example, when using the EBSD method, an inverse pole figure map and a crystal orientation map of a surface (plate surface) or a cross section orthogonal to the plate surface of the AlN single-crystal substrate are measured. The AlN single-crystal substrate can be defined as being oriented along the two axes in the substantially normal direction and a substantially plate-surface direction, when the following conditions are satisfied: in the obtained inverse pole figure map, (A) the crystals are oriented in a specific orientation (first axis) in the substantially normal direction with respect to the plate surface, and (B) the crystals are oriented in a specific orientation (second axis) in the substantially in-plane plate-surface direction, orthogonal to the first axis; and in the obtained crystal orientation map, (C) the inclination angle from the first axis is distributed within ±10°, and (D) the inclination angle from the second axis is distributed within ±10°. In other words, when the above-described four conditions are satisfied, the AlN single-crystal substrate can be determined as being oriented along the two axes, i.e., the c- and a-axes. For example, when the substantially normal direction with respect to the plate surface is oriented along the c-axis, the substantially in-plane plate-surface direction may be oriented in a specific orientation (for example, the a-axis) orthogonal to the c-axis. While the AlN single-crystal substrate may be oriented along the two axes in the substantially normal direction and the substantially in-plane plate-surface direction, it is preferred that the substantially normal direction is oriented along the c-axis. The smaller the inclination angle distribution in the substantially normal direction and/or the substantially in-plane plate-surface direction, the smaller the mosaicity of the AlN single-crystal substrate; and the closer the inclination angle distribution is to zero, the closer the AlN single-crystal substrate is to a perfect single crystal. Therefore, from the viewpoint of crystallinity of the AlN single-crystal substrate, the inclination angle distribution is preferably smaller in both the substantially normal direction and the substantially plate-surface direction, and is preferably within ±5° or less, and more preferably within ±3° or less, for example.

One surface of the AlN single-crystal substrate preferably has an area of 20 cm$^2$ or more, more preferably 70 cm$^2$ or more, and still more preferably 170 cm$^2$ or more. By thus increasing the area of the AlN single-crystal substrate, it is possible to increase the area of the semiconductor layer to be formed thereon. Therefore, it is possible to obtain a larger number of semiconductor elements from a single semiconductor layer, and a reduction in manufacturing costs can be expected. While the upper limit of the size of the AlN single-crystal substrate is not specifically limited, the area of the one surface is typically 710 cm$^2$ or less.

Method of Manufacture

The AlN single-crystal substrate of the present invention can be manufactured by various methods as long as the dislocation densities in the three regions composed of the central section, middle section, and outer circumferential section are controlled to satisfy the predetermined relationship, as described above. A seed substrate may be provided and then an epitaxial film may be formed thereon, or the AlN single-crystal substrate may be directly manufactured by spontaneous nucleation without using a seed substrate. The seed substrate to be used may be an AlN substrate to achieve homoepitaxial growth, or may be a substrate other than the AlN substrate to achieve heteroepitaxial growth. While any of a vapor phase deposition method, a liquid phase deposition method, and a solid phase deposition method may be used to grow a single crystal, the vapor phase deposition method is preferably used to form an AlN single crystal, and then the seed substrate portion is ground away, as required, to allow a desired AlN single-crystal substrate to be obtained. Examples of the vapor phase deposition method include various CVD (chemical vapor deposition) methods (such as thermal CVD, plasma CVD, and MOVPE), a sputtering method, hydride vapor phase epitaxy (HVPE), molecular beam epitaxy (MBE), a sublimation method, and pulsed laser deposition (PLD), with the sublimation method or HVPE being preferred. Examples of the liquid phase deposition method include solution growth methods (such as a flux method). Alternatively, the AlN single-crystal substrate can be obtained without directly forming an AlN single crystal on a seed substrate, by the steps of forming an unoriented precursor layer, forming the unoriented precursor layer into an AlN single-crystal layer by heat treatment, and grinding the seed substrate away. Examples of methods of forming the unoriented precursor layer in this case include an aerosol deposition (AD) method and a hypersonic plasma particle deposition (HPPD) method.

While any of the solid phase deposition method, vapor phase deposition method, and liquid phase deposition method described above may employ known conditions, a technique of fabricating the AlN single-crystal substrate using the sublimation method, for example, is hereinafter described. Specifically, the AlN single-crystal substrate is fabricated by (a) forming an AlN single-crystal layer and (b) grinding a seed substrate away and polishing the surface of the AlN single-crystal layer.

(a) Forming AlN Single-Crystal Layer

Figure 7:
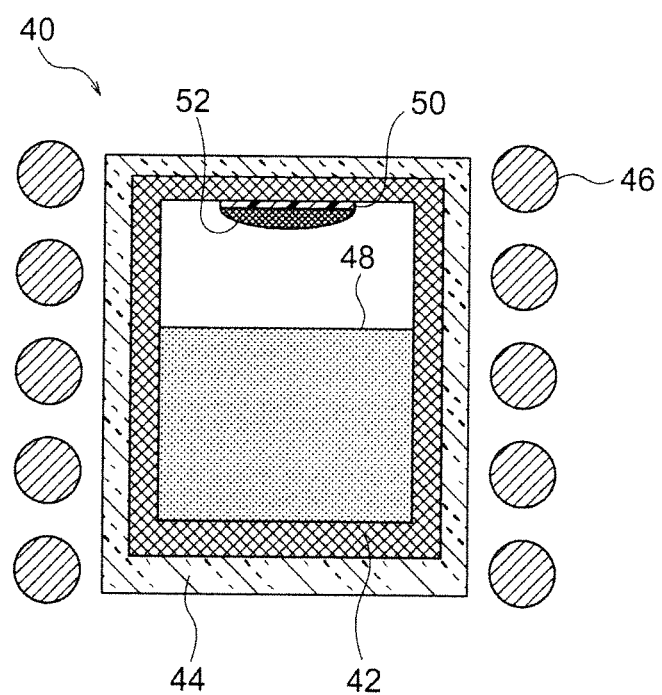
FIG. 7 is a schematic cross-sectional view showing the structure of a crystal growth apparatus used in a sublimation method.

This step is the step of forming an AlN single crystal on a seed substrate in a crystal growth apparatus. FIG. 7 shows one example of the crystal growth apparatus used in the sublimation method. A film formation apparatus 40 shown in FIG. 7 includes a crucible 42, a heat insulating material 44 for heat-insulating the crucible 42, and coils 46 for heating the crucible 42 to a high temperature. The crucible 42 contains AlN raw material powder 48 at a lower portion thereof and has a seed substrate 50 (for example, a SiC single crystal or an AlN/SiC substrate having an AlN single crystal heteroepitaxially grown on a SiC single crystal) at an upper portion thereof, on which sublimated AlN raw material powder 48 is to be deposited. The crucible 42 is pressurized in an Ne atmosphere, and the crucible 42 is heated with the coils 46 to sublimate the AlN raw material powder 48. The pressure is preferably 10 to 100 kPa, and more preferably 20 to 90 kPa. Here, a temperature gradient is generated such that the temperature near the seed substrate 50 at the upper portion of the crucible 42 is lower than the temperature near the AlN raw material powder 48 at the lower portion of the crucible 42. For example, a portion of the crucible 42 near the AlN raw material powder 48 is preferably heated to 1900 to 2250° C., and more preferably 2000 to 2200° C.; and a portion of the crucible 42 near the seed substrate 50 is preferably heated to 1400 to 2150° C., and more preferably 1500 to 2050° C. Here, the temperature of the portion near the seed substrate 50 is preferably lower by 100 to 500° C., more preferably 200 to 400° C., than the temperature near the AlN raw material powder 48. Such heating is preferably maintained for 2 to 100 hours, and more preferably 4 to 90 hours. The temperature can be controlled by measuring temperatures at the upper and lower portions of the crucible 42 with a radiation thermometer (not shown) through holes in the heat insulating material 44 covering the crucible 42, and feeding the results back to the temperature adjustment. In this manner, a SiC single crystal or an AlN/SiC substrate having an AlN single crystal heteroepitaxially grown on a SiC single crystal is placed as the seed substrate 50, and AlN is re-deposited on the surface of the seed substrate 50 to allow an AlN single-crystal layer 52 to be formed.

Here, by previously introducing dislocations into any region in the seed substrate 50, it is possible to obtain an AlN single-crystal substrate in which the dislocation densities in the central section, middle section and outer circumferential section have been controlled. Specifically, the dislocation densities can be controlled by introducing an impurity or a heterogeneous phase into the seed substrate 50, by ion implantation or the like. Examples of the impurity to be introduced include Mg, Al, N, Si, H, C, W, B, Zn, Ti, Be, and Ca, with Mg, Al, N, Si, and B being preferred. Another example of the method for controlling the dislocation densities in the seed substrate is to use the epitaxial lateral overgrowth (ELO) method, which allows an AlN single crystal in which the dislocation density distribution has been controlled to be heteroepitaxially grown on the seed substrate.

(b) Grinding Seed Substrate Away and Polishing Surface of AlN Single-Crystal Layer This step includes the grinding step of grinding the seed substrate away to expose the AlN single-crystal layer; and the polishing step of removing irregularities and defects on the surface of the AlN single crystal. The SiC single crystal remains on the AlN single-crystal layer fabricated by the step (a) above using, for example, the SiC substrate or the AlN/SiC substrate as the seed substrate, and thus, the seed substrate is subjected to grinding to expose the surface of the oriented layer. Additionally, to mirror-finish the surface of the formed AlN single-crystal layer, the plate surface is smoothed by lapping with diamond abrasive grains and then polished by chemical mechanical polishing (CMP) with colloidal silica or the like. In this manner, the AlN single-crystal substrate can be fabricated.

EXAMPLES

The present invention is described in more detail with the following examples.

Examples 1 to 6

(1) Fabrication of AlN Single-Crystal Substrates
(1a) Forming AlN Single-Crystal Layer As shown in FIG. 7, the crucible 42 was used as a crystal growth vessel. As the substrate (seed substrate) 50, an AlN/SiC substrate having dislocations previously introduced into any region by impurity implantation was mounted in this crucible, and the AlN raw material powder 48 was added avoiding contact with the seed substrate 50. This dislocation-introduced AlN/SiC substrate was implanted with B ions as an impurity in the central section, middle section, and outer circumferential section of the AlN/SiC substrate, using an ion implantation apparatus, in the concentrations shown in Table 1. The crucible 42 was pressurized at 50 kPa in a $N_2$ atmosphere, the portion near the AlN raw material powder 48 in the crucible 42 was heated by high-frequency induction heating to 2100° C., while the portion near the AlN/SiC substrate 50 in the crucible 42 was heated to a lower temperature (lower by 200° C.) than that temperature, and the heating was maintained, thereby re-depositing the AlN single-crystal layer 52 on the AlN/SiC substrate 50. The heating was maintained for 10 hours.

(1b) Grinding AlN/SiC Substrate Away and Polishing Surface of AlN Single-Crystal Layer The AlN/SiC substrate having AlN re-deposited thereon, obtained in (1a) above, was ground using a grinding wheel of a size up to #2000, until the AlN single crystal was exposed, and the plate surface was further smoothed by lapping with diamond abrasive grains. Then, the plate surface was subjected to chemical mechanical polishing (CMP)

with colloidal silica to be mirror-finished. In this manner, an AlN single-crystal substrate was fabricated.

(2) Evaluation of AlN Single-Crystal Substrate (2a) EBSD Measurement

Top and bottom surfaces of the AlN single-crystal substrate were subjected to EBSD measurement. The results showed that the AlN crystals were oriented in both the c- and a-axis directions.

(2b) Dislocation Densities

The dislocation density Dc of the central section, the dislocation density Dm of the middle section, and the dislocation density Dp of the outer circumferential section in the AlN single-crystal substrate were measured by transmission X-ray topography (XRTmicron manufactured by Rigaku Corporation). Here, when the dislocation densities were high, a 50 μm×50 μm region on the surface of each of the central section, middle section, and outer circumferential section of the AlN single-crystal substrate was taken as a sample with a film thickness of 300 to 400 nm by focused ion beam (FIB) processing, and then the dislocation densities Dc, Dm, and Dp were measured with a transmission electron microscope (TEM) (H-9000UHR manufactured by Hitachi High-Tech Corporation). Moreover, threading dislocation densities and basal plane dislocation densities in the middle section and outer circumferential section were measured, and the ratio of threading dislocation density to basal plane dislocation density in the dislocations present in the middle section, and the ratio of threading dislocation density to basal plane dislocation density in the dislocations present in the outer circumferential section were calculated. This confirmed that in Examples 1 to 3, the dislocations present in the middle section included more basal plane dislocations than threading dislocations, and the dislocations present in the outer circumferential section included more threading dislocations than basal plane dislocations. The results are shown in Table 1.

(2c) Amount of Warpage

The amount of warpage of the AlN single-crystal substrate was measured using a high-precision laser measuring apparatus (LT-9010M manufactured by Keyence Corporation). As shown in FIG. 2, in a plan-view illustration of a surface of the AlN single-crystal substrate 10 when viewed in plan, two straight lines X and Y were drawn, the straight lines X and Y passing a point G, which is a centroid in the plan-view illustration, and being orthogonal to each other, and then a point A and a point B were defined as two points each positioned on the straight line X and 20 mm away from the point G, and a point C and a point D were defined as two points each positioned on the straight line Y and 20 mm away from the point G. Then, as shown in FIG. 3, of line segments extended vertically to a line segment AB from any points on a curved line AB between the points A and B on the surface 20 of the AlN single-crystal substrate 10, a point P was defined as a point on the curved line AB, at which such a line segment had the longest distance (for example, in FIG. 3, points such as the points P and O are present as any points on the curved line AB. Of the line segments extended vertically to the line segment AB from both points, the line segment extended from the point P is the longest). A distance between the line segment AB and the point P was then determined as an amount of warpage α. Moreover, as shown in FIG. 4, of line segments extended vertically to a line segment CD from any points on a curved line CD between the points C and D on the surface 20 of the AlN single-crystal substrate 10, a point R was defined as a point on the curved line CD, at which such a line segment had the longest distance (for example, in FIG. 4, points such as the points R and O are present as any points on the curved line CD. Of the line segments extended vertically to the line segment CD from both points, the line segment extended from the point R is the longest). A distance between the line segment CD and the point R was then determined as an amount of warpage β. An average value of the amounts of warpage α and β was determined as the amount of warpage of the AlN single-crystal substrate. The results are shown in Table 1.

(2d) Measurement of Off-Angle Distribution

First, as shown in FIGS. 5 and 6, angle differences between the c-axis direction of the AlN single-crystal substrate and the vertical direction to the AlN single-crystal substrate surface, i.e., off-angles, were measured at the central point X, and the outer circumferential points A, B, C, and D, on the surface of the AlN single-crystal substrate 10. The off-angles were measured on the Al surface of the AlN single-crystal substrate, using an automatic X-ray crystal orientation measuring apparatus (FSAS III manufactured by Rigaku Corporation), under a sampling width of 0.01° and a scan speed of 10°/min. Here, the off-angle measurement was performed with the AlN single-crystal substrate being vacuum chucked so that the warpage thereof was 1 μm or less, to minimize the influence of the substrate warpage on the measurement. Then, the difference between the maximum value $\theta_{max}$ and the minimum value $\theta_{min}$ of the off-angles of those obtained at the central point X, and the outer circumferential points A, B, C, and D was determined as the "off-angle distribution (°)" of the AlN single-crystal substrate. As used herein, the off-angles are those obtained by measuring only the angle difference between the vertical direction to the AlN single-crystal substrate surface and the c-axis direction of the AlN single-crystal substrate, without measuring the inclination direction of the off-angles. Moreover, the arithmetic mean angle of the off-angles at the central point X, and the outer circumferential points A, B, C, and D was calculated. The results are shown in Table 1.

Example 7 (Comparative)

This example is a comparative example to show that an AlN single-crystal substrate fabricated following the method disclosed in Patent Literature 1 has a high dislocation density and thus, is unsuitable as a base substrate for producing high-quality light emitting devices.

(1) Fabrication of AlN Single-Crystal Substrate (1a) Forming AlN Single-Crystal Layer An undoped AlN layer was grown to 300 nm using TMAl (trimethylaluminum) and $NH_3$ as raw materials on a single-crystal sapphire C-face substrate by MOVPE. A metal Ti film was deposited to 20 nm on this AlN epitaxial substrate. This substrate having the metal Ti film/the AlN layer/sapphire was placed in an electric furnace and heat-treated at 1300° C. for 20 minutes, in a gas stream adjusted to have a volume ratio of $H_2:NH_3=4:1$. As a result, the metal Ti film was changed into a mesh-like TiN film and simultaneously, a number of voids were formed in the AlN layer. The resulting substrate having the TiN film/the AlN layer/sapphire was placed in a HVPE furnace, and an AlN single-crystal layer was deposited to 550 μm on the TiN film of the substrate. $NH_3$ and AlCl were used as raw materials for the growth, and $N_2$ was used as a carrier gas. The growth conditions were atmospheric pressure and a substrate temperature of 1300° C. The AlN layer delaminated spontaneously from the sapphire substrate at the void layer in the cooling process after the growth was completed. Thus, a free-standing AlN single-crystal substrate was obtained.

(1b) Polishing Surface of AlN Single-Crystal Layer

The free-standing substrate obtained in (1a) above was smoothed by lapping with diamond abrasive grains. Then, the plate surface was subjected to chemical mechanical polishing (CMP) with colloidal silica to be mirror-finished. In this manner, an AlN single-crystal substrate was fabricated.

(2) Evaluation of AlN Single-Crystal Substrate

The AlN single-crystal substrate was evaluated as in Example 1. The results are shown in Table 1.

[Table 1]

TABLE 1

| | AlN single-crystal substrate | | | | | | | | | | |
|---|---|---|---|---|---|---|---|---|---|---|---|
| | Manufacture conditions Ion implanted concentration (/cm$^2$) in seed substrate (AlN/SiC substrate) | | | Dislocation density (/cm$^2$) | | | Ratio of threading dislocation density to basal plane dislocation density in middle section | Ratio of threading dislocation density to basal plane dislocation density in outer circumferential section | Amount of warpage (μm) | Arithmetic mean angle (°) | Off-angle distribution (°) |
| | Central section | Middle section | Outer circumferential section | Central section Dc | Middle section Dm | Outer circumferential section Dp | | | | | |
| Ex. 1 | $1.0 \times 10^{18}$ | $2.2 \times 10^{20}$ | $6.4 \times 10^{19}$ | 400 | 2400 | 1600 | 0.6 | 1.5 | 1.2 | 0.21 | 0.15 |
| Ex. 2 | $3.4 \times 10^{18}$ | $1.9 \times 10^{20}$ | $9.1 \times 10^{19}$ | 600 | 2300 | 1800 | 0.8 | 1.2 | 10.5 | 0.42 | 0.20 |
| Ex. 3 | $1.6 \times 10^{16}$ | $3.1 \times 10^{20}$ | $1.1 \times 10^{20}$ | 100 | 2700 | 1900 | 0.7 | 1.3 | 22.9 | 0.03 | 0.25 |
| Ex. 4* | $1.6 \times 10^{16}$ | $1.6 \times 10^{16}$ | $1.6 \times 10^{16}$ | 100 | 100 | 100 | 0.9 | 1.1 | 26.1 | 0.00 | 0.50 |
| Ex. 5* | $1.2 \times 10^{20}$ | $1.2 \times 10^{20}$ | $1.2 \times 10^{20}$ | 2000 | 2000 | 2000 | 1.2 | 1.0 | 34.3 | 1.50 | 0.70 |
| Ex. 6* | $1.2 \times 10^{17}$ | $1.2 \times 10^{20}$ | $1.2 \times 10^{20}$ | 200 | 2000 | 2000 | 1.1 | 0.8 | 29.8 | 1.10 | 0.60 |
| Ex. 7* | — | — | — | $2.5 \times 10^7$ | $2.3 \times 10^7$ | $2.4 \times 10^7$ | 0.9 | 1.2 | 10.1 | 0.3 | 0.11 |

*indicates comparative examples.

What is claimed is:

1. An AlN single-crystal substrate of a circular shape with a radius r,
   wherein when the AlN single-crystal substrate is sectioned into three regions, the three regions being:
   a central section, which is a region radially extending from a center of the AlN single-crystal substrate to 0.4r,
   a middle section, which is a region excluding the central section from a region radially extending from the center of the AlN single-crystal substrate to 0.7r, and
   an outer circumferential section, which is a region excluding the central section and the middle section from an entire region of the AlN single-crystal substrate,
   a dislocation density Dc of the central section, a dislocation density Dm of the middle section, and a dislocation density Dp of the outer circumferential section satisfy the relationship Dm>Dp>Dc.

2. The AlN single-crystal substrate according to claim 1,
   wherein the dislocation density Dc of the central section is 0 to 1000/cm$^2$,
   wherein the dislocation density Dm of the middle section is 2000 to 4000/cm$^2$, and
   wherein the dislocation density Dp of the outer circumferential section is 1000 to 2000/cm$^2$.

3. The AlN single-crystal substrate according to claim 1,
   wherein the dislocation density Dc of the central section is 100 to 700/cm$^2$,
   wherein the dislocation density Dm of the middle section is 2000 to 2500/cm$^2$, and
   wherein the dislocation density Dp of the outer circumferential section is 1200 to 1800/cm$^2$.

4. The AlN single-crystal substrate according to claim 1,
   wherein dislocations present in the middle section include more basal plane dislocations than threading dislocations, and
   wherein dislocations present in the outer circumferential section include more threading dislocations than basal plane dislocations.

5. The AlN single-crystal substrate according to claim 1,
   wherein the AlN single-crystal substrate has an amount of warpage of 0.5 to 25 μm, and
   wherein the amount of warpage is defined as follows: when, in a plan-view illustration of a surface of the AlN single-crystal substrate when viewed in plan, two straight lines X and Y are drawn, the straight lines X and Y passing a point G, which is a centroid in the plan-view illustration, and being orthogonal to each other, and then a point A and a point B are defined as two points each positioned on the straight line X and 20 mm away from the point G, and a point C and a point D are defined as two points each positioned on the straight line Y and 20 mm away from the point G,
   (i) of line segments extended vertically to a line segment AB from any points on a curved line AB between the points A and B on the surface of the AlN single-crystal substrate, a point P is defined as a point on the curved line AB, at which such a line segment has the longest distance;
   (ii) a distance between the line segment AB and the point P is determined as an amount of warpage α;
   (iii) of line segments extended vertically to a line segment CD from any points on a curved line CD between the points C and D on the surface of the AlN single-crystal substrate, a point R is defined as a point on the curved line CD, at which such a line segment has the longest distance;

(iv) a distance between the line segment CD and the point R is determined as an amount of warpage $\beta$; and (v) the amount of warpage is defined as an arithmetic mean value of the amounts of warpage $\alpha$ and $\beta$.

\* \* \* \* \*